United States Patent [19]
Hatanaka

[11] Patent Number: 4,914,375
[45] Date of Patent: Apr. 3, 1990

[54] SATURABLE REACTOR APPARATUS FOR AUTOMATIC CONTROL OF POWER FACTOR OF INDUCTIVE LOAD

[75] Inventor: Takefumi Hatanaka, Tokyo, Japan

[73] Assignee: Arex Electronics Corporation, Tokyo, Japan

[21] Appl. No.: 362,196

[22] Filed: Jun. 6, 1989

[30] Foreign Application Priority Data

Jun. 8, 1988 [JP] Japan .................. 63-139537

[51] Int. Cl.$^4$ .............................................. G05F 1/70
[52] U.S. Cl. .................................. 323/206; 318/729; 323/251
[58] Field of Search ............... 323/205, 206, 251; 318/729, 815; 363/82

[56] References Cited

U.S. PATENT DOCUMENTS 4,647,837  3/1987  Stemmler ........................... 323/207

FOREIGN PATENT DOCUMENTS 169673  1/1986  European Pat. Off. ............ 323/205

Primary Examiner—William H. Beha, Jr.
Attorney, Agent, or Firm—Jordan and Hamburg

[57] ABSTRACT

An automatic power factor control apparatus for an inductive load such as an AC induction motor includes a circuit for producing a signal varying in accordance with the load power factor, which is applied to control the duty cycle with which switching elements are alternately set in the conducting and non-conducting states by high frequency switching operation. A level of voltage applied to the control winding of a saturable reactor connected in series with the load is controlled by the switching elements, and the saturable reactor thereby continuously controls the input voltage and load current of the inductive load in accordance with the power factor.

4 Claims, 3 Drawing Sheets

SATURABLE REACTOR APPARATUS FOR AUTOMATIC CONTROL OF POWER FACTOR OF INDUCTIVE LOAD

BACKGROUND OF THE INVENTION

The present invention relates to an automatic power factor control apparatus, and in particular to an automatic power factor control apparatus for an inductive load such as an AC induction motor.

Proposals have been made in the prior art for automatically improving the power factor of an inductive load such as an AC induction motor, such as in U.S. Pat. Nos. 4,052,648 and 4,337,640. In these proposals, the power factor is improved by means of phase control of an input voltage that is applied to drive an induction motor. With such types of automatic power factor control apparatus, a thyristor is connected in the AC power supply line, and direct phase control is executed of the AC power voltage that is supplied to the inductive load. As a result, the load current contains large amounts of electromagnetic noise and high frequency components, which results in considerable interference with data processing apparatus such as computers, and with other types of control apparatus such as communication controllers etc. Moreover, the thyristor is triggered once in every cycle of the AC power supply, synchronized with that power supply voltage. However since the phase signal that is used to trigger the thyristor is obtained from the power supply voltage, that signal will be affected by variations in the waveform of that power supply voltage. For that reason, control is not stable, but is affected by the load conditions, and in some conditions control will become impossible. It is therefore difficult to produce an automatic power factor control apparatus that will provide stable operation and reliability, with such prior art methods.

In an attempt to overcome these problems, a proposal has been made for providing a high frequency filter in such an apparatus, in U.S. Pat. No. 4,602,200. However with that proposed apparatus, it is necessary to use a number of high-value capacitors as well as reactors and resistors, so that the overall size of the apparatus would be large and the manufacturing cost would be high. Furthermore, semiconductor elements for electrical power applications have a relatively low degree of overload withstanding capability, so that destruction of circuit elements can readily occur when current surges are produced at the time of start-up of operation of an inductive load. This can result in frequent stoppages of the apparatus for repairs and maintenance. In order to prevent this, it is necessary to use semiconductor elements having a large power-handling capacity, and to use high levels of power for control. This is uneconomical, and electrical losses are high. In addition, it is necessary to provide large heat-dissipation fins on some circuit elements, so that such an automatic power factor control apparatus would present problems with regard to attaining a compact size and low manufacturing cost.

SUMMARY OF THE INVENTION

It is an objective of the present invention to provide an automatic power factor control apparatus for an inductive load, which produces extremely small amounts of electromagnetic noise and high-frequency components. It is a further objection of the present invention to provide an automatic power factor control apparatus for an inductive load, which has a large value of overload withstanding capability, and a high degree of stablity and reliability, so that maintenance of the apparatus is unnecessary.

It is a further objective of the present invention to provide an automatic power factor control apparatus for an inductive load which will have very low levels of thermal loss, making it unnecessary to provide large-size heat dissipation fins on circuit components, and which can automatically control a high value of load while consuming only a low level of power.

It is moreover an objective of the present invention to provide an automatic power factor control apparatus for an inductive load whereby the apparatus can be made extremely light in weight and compact, and whereby the apparatus can be produced at a fraction of the manufacturing cost of a prior art automatic power factor control apparatus.

To achieve the above objectives, an automatic power factor control apparatus comprises:

a saturable reactor having an alternating winding for controlling a level of current which flows in an inductive load that is coupled to an AC power source, and having a control winding for controlling a value of impedance of the alternating winding a stabilized DC voltage source for supplying a DC control voltage to the control winding;

semiconductor switching element means coupled between the stabilized DC voltage source and the control winding, for controlling application of the DC control voltage to the control winding;

power factor detection circuit means for producing an output voltage signal which varies in proportion to a value of power factor of the inductive load; and high frequency pulse width control circuit means for generating a high frequency drive signal comprising pulses having a width which varies in accordance with the output voltage signal;

wherein the semiconductor switching element means execute adjustment of the DC control voltage by being alternately set in conducting and non-conducting states in accordance with the pulse width of the high frequency drive signal, for thereby controlling the impedance of the control winding in accordance with the power factor.

DESCRIPTION OF PREFERRED EMBODIMENTS

Figure 1:
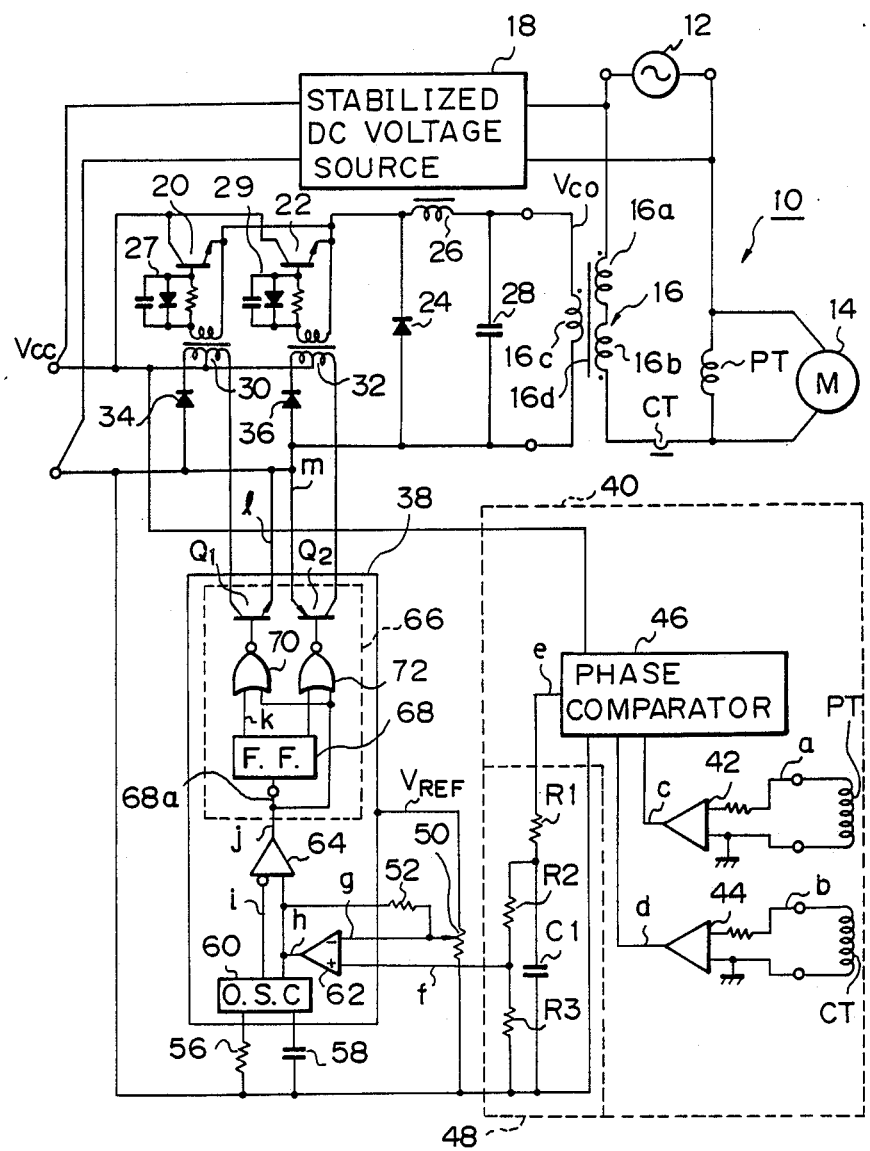
FIG. 1 is a circuit diagram of an embodiment of an automatic power factor control apparatus according to the present invention.

FIG. 1 is a circuit diagram of a preferred embodiment of an automatic power factor control apparatus according to the present invention, designated by numeral 10. The apparatus includes a saturable reactor 16, which is connected between one line of an AC power source 12 and an inductive load 14. The inductive load 14 can for example consist of an inductance motor. The saturable reactor 16 has first and second alternating windings 16a, 16b, which are connected in series with the AC power line, for adjusting the load current of the inductive load 14, and also has a control winding 16c for controlling the impedance of the alternating windings 16a, 16b. These windings are wound upon a saturable reactor core 16d. Preferably, the combined impedance of the alternating windings 16a, 16b varies within a range (determined by the load factor of the inductive load 14) such that the voltage drop that occurs across the alternating windings 16a, 16b is within a range of 5% to 30% of the AC supply voltage that is inputted by the AC power source 12, when the control winding 16c is in the magnetically non-excited state. Due to this, the VA (volt-amplifier) rating of the saturable reactor can be selected to be within a range of 5% to 30% of the VA rating of the inductive load 14. Hence, the saturable reactor 16 can be of compact size and low in cost.

Figure 2:
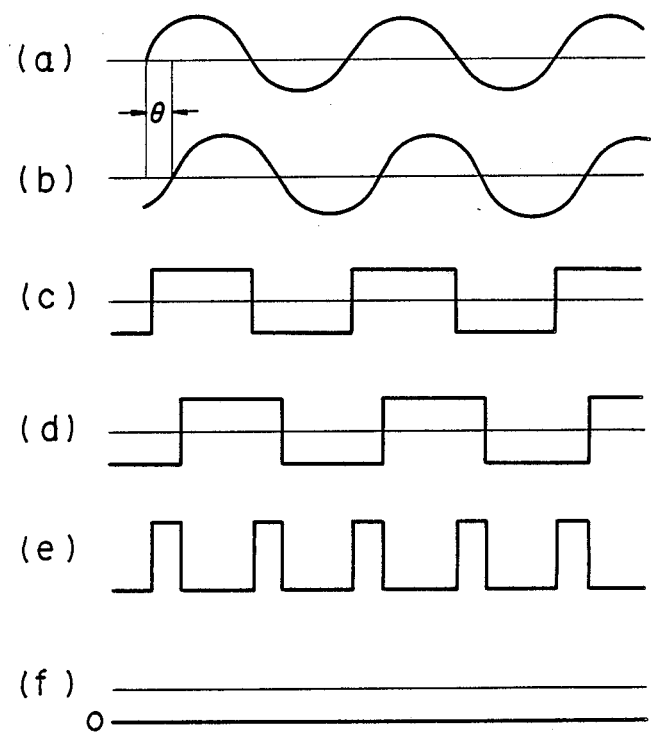
FIG. 2 is a voltage waveform diagram for a power factor detection circuit 40 shown in FIG. 1.

The AC power source 12 is also coupled to supply power to a stabilized DC voltage source 18, which supplies a stabilized DC control voltage $V_{cc}$ through switching elements (described hereinafter) to the control winding 16c. The stabilized DC voltage source 18 can be a commercially available low-voltage switching-type regulated power supply, capable of producing a fixed voltage in the range of 12 to 50 V, for example. First and second switching elements 20, 22, which in this embodiment consist of respective transistors, are connected mutually in parallel between the stabilized DC voltage source 18 and the control winding 16c. The switching elements 20, 22 are respectively switched to the conducting and non-conducting states in response to a high frequency drive signal (described hereinafter), for adjusting the level of a DC control voltage (designated as $V_{co}$) that is applied to the control winding 16c, such as to set the impedance of the alternating windings 16a, 16b to provide optimum control that is matched to the value of the inductive load 14. The outputs of the switching elements 20, 22 are connected in common to one terminal of a diode 24, and to a smoothing circuit formed of a series inductor 26 and a capacitor 28. The base terminals of the switching elements 20, 22 are respectively connected to be driven by the secondary windings of transformers 30 and 32 through base drive circuits 27 and 29. The center taps of the primary windings of the transformers 30, 32 are connected to the Vcc potential, while one end of each of these primary windings is coupled to receive a corresponding drive signal produced from a high frequency pulse width control circuit 38 (described hereinafter). The other end of each of the primary windings of the transformers 30, 32 are connected to the 0 V potential of the supply voltage from the stabilized DC voltage source 18, through respective diodes 34 and 36. The high frequency pulse width control circuit 38 generates two high frequency drive signals, whose pulse width (i.e. duty cycle) varies in accordance with an output voltage signal that is produced from a power factor detection circuit 40 (described hereinafter). This output voltage signal varies in proportion to the power factor of the inductive load 14. In this embodiment, the power factor detection circuit 40 includes a voltage transformer PT which detects the phase of the input voltage that is applied to the inductive load 14 and a current transformer CT which detects the phase of the load current that flows in the inductive load 14. As is clear from FIG. 2, a voltage signal a from the voltage transformer PT and a current signal b from the current transformer CT are converted to respective rectangular waveform signals, c and d, by means of respective waveform shaping circuits 42 and 44, each consisting of an operational amplifier. These signals c and d are then supplied to a phase comparator 46, (which can be based on a NOR circuit or an operational amplifier) to be compared in phase. A pulse signal e is thereby produced from the phase comparator 46, whose pulse width varies in proportion to the phase difference between the voltage signal a and the current signal b. The pulse signal e is then applied to a circuit 48 which functions both as a low pass filter and as a start-up timer circuit, and includes resistors R1, R2, R3 and a capacitor C1. The pulse signal e is thereby converted to a DC voltage signal f. Resistors R2 and R3 function as a voltage divider for reducing the amount of ripple in the DC voltage signal f. The time constant of the resistor R1 and capacitor C1 is selected such that an output voltage is produced from the circuit 48 for a fixed time interval at the time of start-up of operating the inductive load 14, this output voltage being lower than a reference voltage that corresponds to a predetermined value of power factor for the inductive load 14. In this example, the predetermined power factor is 0.8. As a result, during operation start-up of the inductive load 14, the saturable reactor 16 is held in a completely saturated state for a fixed time interval, and the maximum value of input voltage is applied to the inductive load 14 during that time. When the power factor of the inductive load 14 is high, so that the phase difference between the input voltage and load current of the inductive load 14 is small, the output voltage signal f is at a low level. Conversely, when the power factor of the inductive load 14 is small, so that the phase difference between the input voltage and load current of the inductive load 14 is large, the output voltage signal f is at a high level. Thus, the output voltage signal f varies in proportion to the power factor. The phase difference between the input voltage and load current of the inductive load 14 is held at a predetermined value (i.e. corresponding to a power factor of 0.8) due to the output from a reference voltage setting circuit formed of a fixed reference voltage source within the high frequency pulse width control circuit 38 (not shown in the drawing) and variable resistor 50 being applied to the input of the high frequency pulse width control circuit 38. One terminal of the variable resistor 50 is coupled to receive a fixed reference voltage $V_{REF}$ from the fixed reference voltage source, and the other terminal to the 0 V supply potential. A set value of reference voltage, designated as a reference voltage signal g, is thereby produced from the slider of the variable resistor 50, which determines the aforementioned value of preset power factor. A feedback resistor 52 has a value selected to provide a desired value of gain for the high frequency pulse width control circuit 38.

The high frequency pulse width control circuit 38 can consist for example of commercially available integrated circuits such as the Texas Instruments Co. TL494 (pulse width controller) or the Nippon Electric Co. PC494 (control circuit for switching regulator). Such integrated circuits are manufactured in large quantities for use in switching regulator control, and therefore are available at low cost.

In FIG. 1, the high frequency pulse width control circuit 38 is supplies with the output voltage from the stabilized DC voltage source 18, and includes a ramp signal generating oscillator 60 which is coupled through a resistor 56 and capacitor 58 to the output voltage of the stabilized DC voltage source 18, and an error amplifier 62. The oscillation frequency of the ramp signal generating oscillator 60 is determined by the external resistor 56 and capacitor 58. The inverting input terminal of the error amplifier 62 is connected to receive the reference voltage signal g, while the non-inverting input terminal is coupled to the output of the LPF/start-up timer circuit 48. The output voltage signal f and the reference voltage signal g are compared by the error amplifier 62, and a control voltage signal h is thereby produced which varies in proportion to the difference between the signals f and g, i.e. varies in proportion to the level of the output voltage signal f. The control voltage signal h is supplied to an input of a PWM comparator 64, to be compared with a ramp signal i that is produced from the ramp signal generating oscillator 60, and thereby converted to a high frequency PWM signal j, which is supplied to the output control circuit 66. During operation start-up of the inductive load 14, the output voltage signal f from the LPF/start-up timer circuit 48 is held at the low level during a fixed time that is determined by the values of R1 and C1, and hence during that time the control voltage signal h is held at the low level. Thus, respective duty cycles of drive signals which are produced from output transistors Q1 and Q2 of the output control circuit 66 are set to a maximum value during start-up. The switching elements 20, 22 thereby produce drive outputs with maximum duty cycle during start-up. The saturable reactor 16 is thereby completely saturated, so that the input voltage applied to the inductive load 14 is a maximum. After the aforementioned fixed time has elapsed, the high frequency pulse width control circuit 38 begins to produce operational high frequency drive signals in accordance with the load condition of the inductive load 14, i.e. in response to the control voltage signal h which varies in accordance with the power factor of the inductive load 14.

Figure 3:
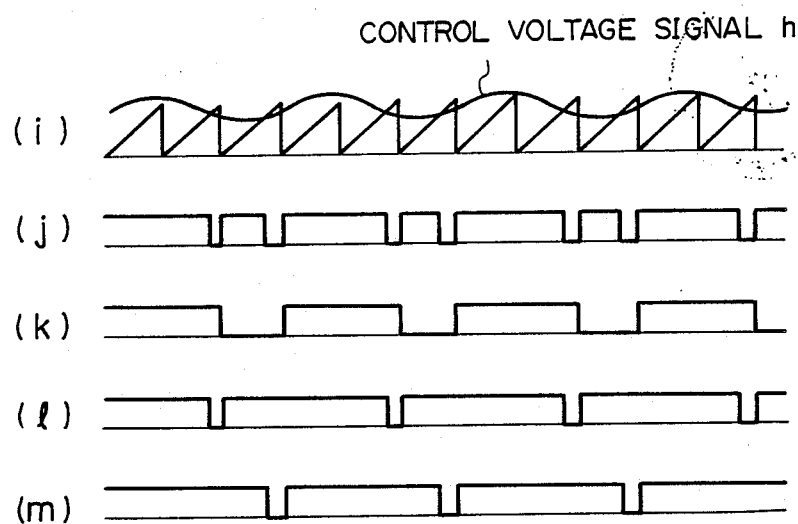
Fig. 3 shows the waveforms of signals in a high frequency pulse width control circuit 38 of FIG. 1.
Figure 4:
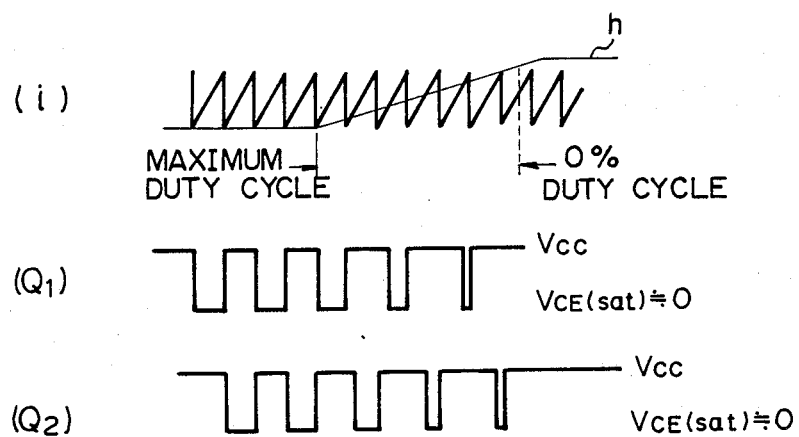
FIG. 4 is a waveform diagram showing the relationship between a control voltage signal and output signals produced from the high frequency pulse width control circuit 38.

The output control circuit 66 includes a D-type flip-flop 68 which is triggered on rising edges of pulses of the PWM signal j that is supplied from the PWM comparator 64 via an input line 68a, and NOR gates 70, 72 in addition to the transistors Q1, Q2. The output signal waveforms of the output control circuit 66 are shown in FIG. 3. The Q and Q output signals from the D-FF 68, one of which is indicated as signal k, are applied to respective inputs of the NOR gates 70, 72, while the PWM signal j is applied to the other inputs of gates 70, 72. The aforementioned output drive signals, designated as signals 1 and m, are thereby produced from the transistors Q1, Q2. As shown in the waveform diagram of FIG. 4, the output signal f from the power factor detection circuit 40 and the control voltage signal h go to the high level when the power factor of the inductive load 14 is low, while signals f and h go towards the low level as the power factor increases. Thus, the duty cycle of the output transistors Q1, Q2 of the high frequency pulse width control circuit 38 attains a value which results in a high level of control voltage $V_{co}$ being applied to the control winding 16c when the control voltage signal h is at the low level. When the level of the control voltage signal h exceeds a specific threshold voltage, the duty cycles of the output transistors Q1, Q2 each become zero, so that the conduction time intervals of the switching elements 20, 22 reach a minimum, and hence the level of control voltage $V_{co}$ applied to the control winding 16c is minimized. Reduction of the control voltage $V_{co}$ increases the impedance of windings 16a, 16b, and hence a reduction of the input voltage applied to the inductive load 14 results from an increase in the power factor of the inductive load 14. Conversely, as the power factor increases, the duty cycles of the drive signals 1 and m from the high frequency pulse width control circuit 38 are increased, and the conduction time intervals of the switching elements 20, 22 are thereby increased, causing an increase in the control voltage $V_{co}$, whereby the input voltage and load current of the inductive load 14 are increased. In this way, continuous automatic control of the input voltage of the inductive load 14 is executed in accordance with the power factor of the inductive load 14.

Although the invention has been described in the above for a specific embodiment of a power factor detection circuit, it would be equally possible to use other types of power factor detection circuit, such as that disclosed in the load indication apparatus of U.S. Pat. No. 4,117,408, the synchronous motor control circuit of U.S. Pat. No. 4,389,607, the power factor detection apparatus of Japanese Patent Laid Open No. 59-661 or 59-52573, or the power factor and current signal conversion apparatus of Japanese Patent Publication No. 51-5595.

The following results are obtained by automatic power factor control apparatus according to the present invention as described hereinabove:

(1) Since control of the saturable reactor impedance is continuously executed automatically in accordance with the power factor of the inductive load, both the load current and input voltage of the load are controlled in accordance with the load conditions. Substantial energy saving can thereby be attained when an inductive load is driven.

(2) Since the load current is controlled by means of a saturable reactor, without executing direct switching of the AC voltage of the power supply line, the level of electromagnetic noise that is generated is very small, while the high frequency components of the load current are also very small. Thus, only a very low level of interference will be generated in any adjacent apparatus such as computers, communication controllers, etc.

(3) Since the electromagnetic noise and high frequency components are very small, it is not necessary to use large and expensive high frequency filters, and the invention enables a very lightweight and compact automatic power factor control apparatus to be produced which provides reliable and stable operation.

(4) Since low-voltage, low-power switching is executed by the semiconductor switching elements to control the saturable reactor, i.e. which do not directly control the AC power line voltage, the semiconductor switching elements and associated components can be very small in size and low in cost, and the circuit can be easily designed.

(5) Since the voltage drop which occurs across the saturable reactor is in a range of 5 to 30% of the AC power line voltage, the VA rating of the saturable reactor can be low, so that the overall dimensions of the apparatus can be small and the manufacturing cost held to a low amount.

(6) The invention enables high-capacity, high-voltage power factor control to be achieved, using a combination of low-voltage, low-power semiconductor switching elements and a small-sized variable saturable reactor. Hence, the invention enables power factor control with large values of load to be implemented by using very low-cost electronic components, without high frequency components being transmitted to the AC power line.

(7) Control of a large value of load can be achieved by using a compact size of saturable reactor, and a switching control circuit which has very low power consumption (approximately 1 to 1.5% of the overall power consumption). Hence, the electrical losses and heat generated within the apparatus are held to very low levels, so that very efficient operation is attained.

(8) The overload withstanding capability of the alternating winding of the saturable reactor is high, so that open-circuits in the alternating winding will not readily occur as a result of current surges produced at the time of start-up of the inductive load Thus, an automatic power factor control apparatus can be applied to a wide range of inductive load.

What is claimed is:

1. An automatic power factor control apparatus comprising:
   a saturable reactor having an alternating winding for controlling a level of current which flows in an inductive load that is coupled to an AC power source, and having a control winding for controlling a value of impedance of said alternating winding
   a stabilized DC voltage source for supplying a DC control voltage to said control winding;
   semiconductor switching element means coupled between said stablized DC voltage source and said control winding, for controlling application of said DC control voltage to said control winding;
   power factor detection circuit means for producing an output voltage signal which varies in proportion to a value of power factor of said inductive load; and
   high frequency pulse width control circuit means for generating a high frequency drive signal comprising pulses having a width which varies in accordance with said output voltage signal;
   wherein said semiconductor switching element means execute adjustment of said DC control voltage by being alternately set in conducting and non-conducting states in accordance with the pulse width of said high frequency drive signal, for thereby controlling the impedance of said control winding in accordance with said power factor.

2. An apparatus according to claim 1, in which said high frequency pulse width control circuit comprises:
   ramp signal generating oscillator means for producing a ramp signal;
   reference voltage setting circuit means for setting a reference voltage in accordance with a predetermined value of power factor;
   error amplifier means for comparing said reference voltage with said output voltage signal to thereby produce a control voltage signal;
   pulse width modulation comparator means for comparing said ramp signal with said control voltage signal, to generate as output a high frequency pulse width modulated signal; and
   output control circuit means for generating a drive signal in response to said high frequency pulse width modulated signal.

3. An automatic power factor control apparatus, comprising:
   a saturable reactor having first and second alternating windings connected in series between an AC power source and an inductive load, with a voltage drop produced across said first and second alternating windings being within a range of 5% to 30% of a value of voltage supplied by said AC power source, and a control winding for controlling a value of impedance of said first and second alternating windings;
   a stabilized DC voltage source for supplying a DC control voltage to said control winding;
   semiconductor switching element means coupled between said stabilized DC voltage source and said control winding, for controlling application of said DC control voltage to said control winding;
   power factor detection circuit means for detecting a phase difference between an AC voltage that is applied to said inductive load and a load current which flows in said inductive load, and for producing an output voltage signal which varies in proportion to a value of power factor of said inductive load;
   reference voltage setting circuit means for setting a reference voltage which corresponds to a predetermined value of said phase difference ; and
   high frequency pulse width control circuit means for generating a high frequency drive signal comprising pulses having a width which varies in accordance with a difference between said output voltage signal and said reference voltage;
   wherein said semiconductor switching element means execute adjustment of said DC control voltage by being alternately set in conducting and non-conducting states with a duty cycle that is determined by said high frequency drive signal, whereby the impedance of said first and second alternating windings is controlled in accordance with said power factor.

4. An automatic power factor control apparatus according to claim 3, in which said high frequency pulse width control circuit comprises:
   pulse signal generating oscillator means;
   error amplifier means for comparing said reference voltage and said output voltage signal, for producing a control voltage signal;
   pulse width modulation comparator means for comparing said ramp signal with said control voltage signal, to generates as output a high frequency pulse width modulated signal;
   output control circuit means for generating said drive signal in response to said high frequency pulse width modulated signal.

* * * * *